Figure 1:
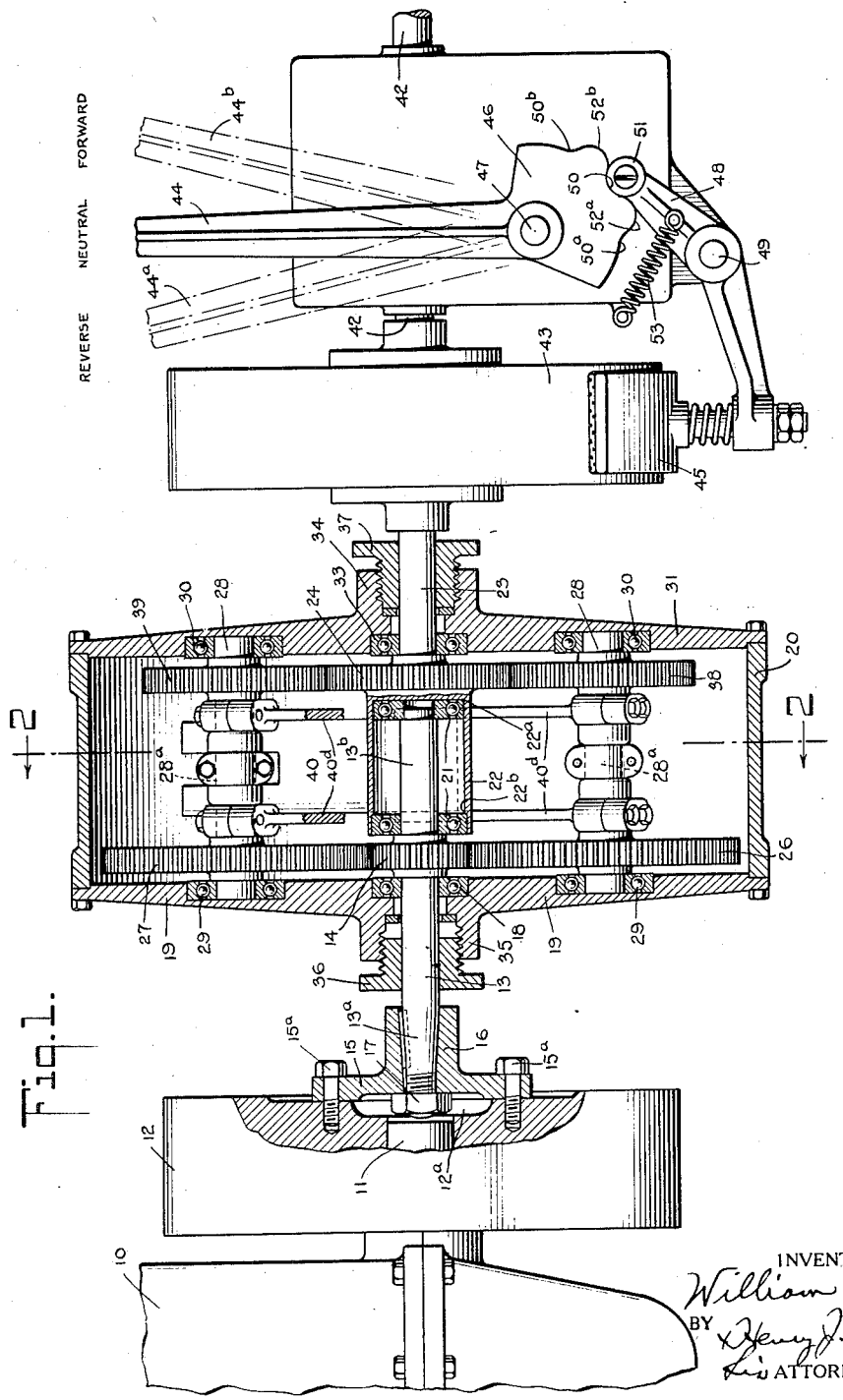

Patented Apr. 1, 1930

1,752,755

UNITED STATES PATENT OFFICE

WILLIAM PITT, OF BROOKLYN, NEW YORK

AUTOMATIC VARIABLE TRANSMISSION MECHANISM

Application filed July 12, 1928. Serial No. 292,144.

This invention relates to automatic variable transmission mechanism.

Pursuant to my invention, variable speed and corresponding torque are automatically provided by the assembly of two or more planet gears carried by a suitable casing in combination with a central gear and suitable centrifugal means, whereby upon the driving rotation of the motor shaft under control of an accelerator or other suitable controlling means, the rotation of the propeller shaft of the automobile or equivalent is automatically varied in speed and at corresponding torque.

In the instances of use of my transmission device for stationary motive machines, a similar control of the driven member is effected by the operation of the speed controlling means or equivalent controlling device.

My present invention is an improvement over that set forth and described in my co-pending application, Ser. No. 176,355, filed March 18, 1927, and entitled Transmission for automobiles.

A preferred form of my invention comprises a casing, a set of planet gears, each gear having a shaft rotatively mounted in said casing, a central or sun gear driven by the motor shaft and meshing with said set of planet gears, a set of centrifugal devices for said planet-gear shafts, a second set of planet gears rotatively fixed on said planet gear shafts, a second central or sun gear for actuating the driven shaft and meshing with said second set of planet gears respectively.

My present invention is an improvement over that set forth and described in my co-pending application, Serial No. 176,355, filed March 18, 1927, and entitled Transmission for automobiles, in that the centrifugal devices preferably provided for in my present invention are not directly mounted upon the planet gear shafts as is set forth in my aforesaid co-pending application, but are indirectly mounted by means of crank and link connections therewith. Also, preferably, the centrifugal device for any one planet gear shaft is connected by a link with an associated planetary gear shaft.

It is advantageous for gear reduction to employ the aforesaid second central or sun gear, i. e. for driving the driven shaft, of greater diameter as compared with the aforesaid first central gear, and accordingly associated with planet gears of the aforesaid second set of correspondingly less diameter as compared with the planet gears of the aforesaid first set.

My invention is advantageously utilized in combination with suitable control means for effecting the rate of rotation of the propeller shaft or other driven member, and for attaining "neutral" position and also for deriving "reverse" drive.

The assembly of my transmission means also is preferably associated with a momentum device as in the form of a fly wheel.

Further features and objects of the invention will be more fully understood from the following detail description and the accompanying drawings, in which—

Figure 2:
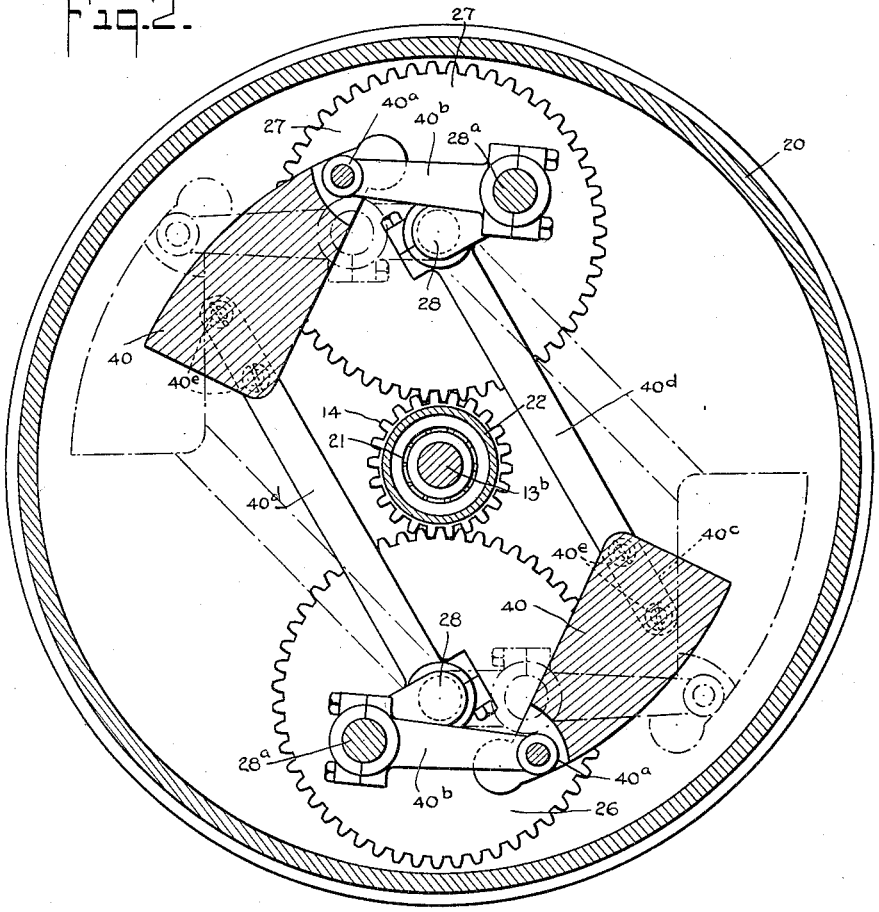

Fig. 1 is a central vertical sectional elevation of a preferred form of my invention, showing the use of two sets of planet gears; and Fig. 2 is a sectional elevation on line 2—2, of Fig. 1.

Referring to Figs. 1 and 2, the regulation or other approved automotive motor is indicated at 10, the main motor shaft is indicated at 11 and the motor fly wheel at 12. My variable transmission device may be associated with such automotive motor 10 by securing to the posterior side of the fly wheel 12 the shaft 13 of the herein termed first central or sun gear 14. Such securement may be had by a hollow bracket 15 removably affixed by the tap bolts 15ª within the hollowed posterior side 12ª of the fly wheel 12, said bracket 15 being removably secured to the anterior end 13ª of the shaft 13 by means of the wedge clamping portion 16 receiving the tapered shaft end 13ª in co-action with the nut 17 meshing with the screw at the terminal of the shaft end 13ª.

The body portion of the shaft 13 extends through the thrust bearing 18 disposed in the anterior wall 19 of the transmission casing 20. The aforesaid first central or sun gear 14 may be splined or otherwise fixed to approximately the central or sun portion of its shaft 13, and the posterior portion 13b of the shaft 13 is journaled in the bearing 21 disposed within and carried by the bearing housing 22. The bearing housing 22 is secured at its posterior portion 22a or may form a part of the shaft 23 of the herein termed second central or sun gear 24, as will appear more fully hereinafter. The anterior portion 22b of the bearing housing 22 is preferably freely journaled, on a thrust bearing, which is disposed between the bearing housing 22 and the central portion of the shaft 13, and closely adjacent to the first central or sun gear 14.

Meshing with the aforesaid first central gear 14 is a set of gears, say two in number, respectively designated 26, 27, see also Fig. 2; said gears 26, 27 are herein termed the first set of planet gears. Each shaft 28 of said planet gears 26, 27 is suitably rotatably mounted at its opposite ends within the casing 20 as by means of the bearings 29, 29, disposed in suitable openings in the anterior wall 19 of the transmission casing 20 and by means of the oppositely disposed bearings 30, 30, disposed in suitable openings in the posterior wall 31 of the transmission casing 20. The anterior wall 19 and the posterior wall 31 of the transmission casing 20 are preferably bolted to adjacent edges of the transmission casing 20 to provide for removability of the same. The transmission casing 20 is conveniently of hollow cylindrical formation.

The shaft 23 of the second central gear 24 is journaled in the bearing 33, carried in the central opening 34 of the posterior wall 31 of the transmission casing 20.

It will be observed that the bearing 18 of the shaft 13 of the first central gear 14 is disposed within the central opening 35 of the anterior wall 19 of the transmission casing 20. The annular gland nuts 36, 37 with suitable packing are provided about the shaft 13 and the shaft 23 respectively, to seal the bearings 18, 33, respectively and the interior of the transmission casing 20 from entry of dust and from the leakage of lubricant therefrom.

Splined or otherwise fixed to the respective gear shafts 28 is the second set of planet gears corresponding to the foresaid first set of planet gears, and of corresponding number, in this instance, two; the second set of planet gears are respectively designated 38, 39, see Fig. 2.

Associated with said planet shafts 28 and acting in common with the corresponding gears of the first and second sets of planet gears are centrifugal devices, shown in the form of weighted masses 40. Each such weighted mass 40 is preferably associated with its planet gear shaft 28 through the intermediation of a crank 28a located say at the central portion of each shaft 28; each centrifugal device 40 is pivotally connected at its one end 40a by means of the link 40b to the crank shaft 28a of one planet gear shaft 28 and connected at its opposite end 40c by the arm 40d to the associated shaft 28. The connection of the link 40d with the centrifugal device 40 is preferably of a known pivotal nature, as by means of a plurality of studs 40e.

It is advantageous for gear reduction to select the second central gear 24 of greater diameter as compared with the first central gear 14 and to associate the gears 38, 39 with the second set of planet gears of correspondingly reduced diameter for respectively meshing with the second central gear 24.

The posterior end of the shaft 23 of the second central gear 24 is suitably connected to the propeller shaft 42 or equivalent of the automobile, or other propeller vehicle, or the like. When my invention is employed for aeroplanes, motorboats or the like, the propeller shaft 42 is connected to a suitable propeller or equivalent for propulsion of the same.

I prefer to provide the posterior shaft 23 or equivalent with any suitable form of flywheel or other inertia device, such as the weighted cylindrical or disk wheel 43, which may be made of cast iron.

To provide for the propulsion of the automobile or other vehicle at will either in a forword direction or in a rearward direction, I provide suitable direction controlling means, as in the form of a manually operable lever 44, foot pedal or the like whereby for one position of such lever, say the dash and dot position 44a representing the "reverse position" the shaft 23 of my transmission means is connected through suitable reversing gearing with the propeller shaft 42. The opposite position 44b, shown in dot and dash outline in Fig. 1, represents the "forward" position of the lever 44, whereby the shaft 23 of my transmission device is connected by a clutch (not shown) or equivalent directly with the propeller shaft 42.

The full outline position 44 shown in Fig. 1 represents the neutral position of such direction lever in which position the shaft 23 of my transmission device is disconnected from the propeller shaft 42. It is advantageous for engine testing purposes and for other purposes to effect the disconnection between my transmission means and the propeller shaft.

I provide for suitable control means for effecting the quiescence of the posterior shaft 23 of my transmission means in the interim of movement of my direction lever 44 from "neutral" to "reverse" preparatory to bringing into mesh a suitable gear on my transmission shaft 23 with the reverse gearing, and also during the interim of movement of my direction lever 44 from "neutral" to "forward" preparatory to clutching the transmission shaft 23 with the propeller shaft 42.

As one form of such control means operated by the lever 44 I employ brake band sections 45, cooperating with the fly wheel 43, or equivalent and combined with a multiple cam 46 secured to the shaft 47 of the direction lever 44 and cooperating with the rock lever 48 or equivalent means mounted on the stud shaft 49 for operating the brake band sections 45. For the neutral position 44 of the lever 44, as shown in Fig. 1, the cam depression 50 receives the roller 51 of the rock lever 48, the extent of such cam depression relative to the effective radius of the cam plate 46 on the shaft 47 provides for the movement of the brake band sections 45 under their usual releasing spring means to non-breaking position. However, upon shifting forward the lever 44 to its "reverse" position 44$^a$ the cam rise 52$^a$ encounters the roller 51 and rocks the rocker arm 48 against its return spring 53 to set the brake band sections 45 in braking position for the period of transit of the roller relative to the cam rise 52$^a$. Upon the roller 51 attaining the cam depression 50$^a$, the rocker arm 48, rocked by its spring 53 in return direction, moves the brake band sections 45 to non-braking position.

Similarly, the cam rise 52$^b$ depresses the cam roller 51 and the rocker arm 48 to set the brake band sections 45 in braking position for the period of effective transit of the roller 51 relative to the cam rise 52$^b$, and upon the control lever 44 attaining its position 44$^b$ for "forward" connection of the posterior shaft 23 of my transmission means with the propeller shaft 42 and cam depression 50$^b$ is attained by the cam roller 51, whereupon the brake band sections 45 are moved to non-braking position.

The usual foot or emergency brake (not shown) for the tractive wheels or propeller shaft, or both as preferred, may be employed.

Let us assume the automobile to be at rest, with the brake of the tractive wheels in braked position, the direction lever 44 in its position 44$^b$ for "forward" driving, and the starter of the engine operated to set the engine in idling rotation. The engine shaft 11 is thereby set in rotation, causing the anterior shaft 13 of my transmission means to be likewise rotated. Let us assume that the rotation of the engine shaft and therefore of the anterior transmission shaft 13 is in clockwise direction.

By reason of the enmeshing of the first central gear 14 with its set of planet gears 26, 27, the planet gears 26, 27 are rotated counter-clockwise. It is borne in mind that said second set of planet gears 38, 39 mesh with the second central gear 24, which under the conditions assumed tends to be held stationary by the braked position of the propeller shaft or tractive wheels.

In such circumstances, the rotation of the motor shaft 11 effects the bodily and individual axial rotation of the gears 26, 27 and 38, 39 of the respective first and second sets of planet gears and of the transmission casing 20 about the central axis of the transmission casing 20 in counter-clockwise direction.

At such idling speed, the centrifugal masses 40 effect only a negligible resistance to the rotation of the respective gear shafts 28, 28.

During this stage, the centrifugal devices have a general radial movement as well as their bodily rotation as aforesaid, which general radial movement is effected by the rotations of the crank 28$^a$.

Upon now releasing the automobile brake to thereby free the propeller shaft and the tractive wheels and upon depressing the foot accelerator to derive an increasing engine speed, such increasing engine speed causes a corresponding increasing speed of rotation of the anterior shaft 13 and the first central gear 14 in a clockwise direction, and the first central gear 14 in turn causes an increasing speed of counter-clockwise rotation of the first set of planet gears 26, 27, and the second set of planet gears 38, 39, which mesh with the second central gear 24; the second central gear 24 during this period is held stationary by the inertia of the vehicle, causing counterclockwise bodily rotation of the casing 20. This bodily rotation of the casing 20 causes centrifugal force to act against the radial movement of the centrifugal devices 40, 40, during the period of their movement toward the axis of the shafts 13, 23; the above mentioned centrifugal force varies with the speed of bodily rotation of the casing 20, therefore with an increasing engine speed and increasing clockwise torque applied to the second central gear 24.

By reason of the mountings provided for the centrifugal devices 40, 40, the movements of the same are restricted to certain regions respectively of the relatively small areas as compared with the centrifugal devices when mounted directly upon the planet gear shafts, as is set forth in my aforesaid co-pending application Ser. No. 176,355. Such advantageous result is derived by the provision of the crank shafts 28$^a$ to which each centrifugal device is directly pivoted and further to the employment of the links 40$^d$ connecting each centrifugal device 40 to the co-operating planet gear shaft. The limited range of movement of the centrifugal devices is illustrated in Fig. 2, namely, by the one extreme position shown in dash and dot outline and the other extreme position shown in hatched outline. It will be observed that each centrifugal device in this instance does not fly about its planet gear shaft as an axis and therefore no force is applied by the centrifugal device tending to urge its planet gear shaft about its own axis. However, each centrifugal device 40 exerts its full force by reason of its rotation bodily about the axis of the casing 20, together with the momentum of the casing 20 and therewith the planet gearing and the respective planet gear shafts, all bodily about the axis of the casing. Such rotations as may be effected by the centrifugal devices about their crank shafts 28 introduce a fluctuation in the total rotational effect of each planet gear shaft upon the ultimate driving effect by the engine shaft upon the propeller shaft but such fluctuations are substantially overcome by the use of a fly wheel 43, as is set forth more fully hereinafter.

Assuming the vehicle to be at rest, the application of increasing torque transmitted from the engine shaft to the propeller shaft 42 sets the vehicle into motion as rapidly as the engine speed develops under the load imposed upon it. This drive corresponds to a low gear drive used at the present time with automobiles generally. When the vehicle attains the speed at which it is desired to operate with a one to one drive, the accelerator pedal is permitted to rise to cause decreasing engine speed while the propeller shaft speed remains approximately the same, so that when the anterior shaft 13 and the posterior shaft 23 reach substantially the same speed, a clutch-like connection becomes effective between the anterior shaft 13 and the posterior shaft 23 by the centrifugal force maintaining the centrifugal devices 40, 40 in their bodily outward rotation, thereby preventing rotation of the planet gears. The above centrifugal force is now maintained by the bodily clockwise rotation of the casing 20. When the accelerator is permitted to rise, as just described, the counterclockwise rotation of the casing 20 comes to an end and thereafter the casing 20 rotates clockwise at engine speed when the above described high speed or one to one drive is reached. When a grade is encountered that requires a more advantageous gearing to enable vehicle to ascend considering it to be in the one to one drive state, the increasing load imposed upon the engine causes a drop in the engine speed and this drop causes a falling off of the centrifugal force that maintained the clutch-like connection of the shafts 13 and 23, whereupon the transmission means assumes a starting or low speed drive. The change from high to low may be hastened by raising the accelerator to cause the engine speed to drop faster than would be ordinarily decreased by the load.

Upon bringing the car to rest by applying the automobile brake, as when stopping or parking, with the engine idling, the propeller shaft 42 is brought to rest, and the idling drive of the motor is effected by the bodily and individual rotation of the planet gears 26, 27, 38, 39 and the transmission casing 20.

To increase the centrifugal effect of such centrifugal device 40, the same may be of hollow metal and contain mercury or like material of relatively high specific gravity.

To "reverse" the drive of the automobile, the direction lever 44 is shifted to its reverse position 44ª, with the intermediate braking of the posterior shaft 23 by the brake band 45 and fly-wheel 43, as above described, and upon depression of the foot accelerator, the automobile is driven in reverse direction, such actuation taking place by means of a similar bodily rotation of my transmission casing 20 and the individual and bodily rotation of the enclosed gears 26, 27, 38, 39 and centrifugal devices 40.

The transmission casing 20 may be suitably rotarily supported, as by means of brackets or the like extending from the chassis frame and supporting suitable bearings for receiving the hubs 34 and 35, see Fig. 1, which in such instance are suitably enlarged and arranged.

Whereas I have described my invention by reference to specific forms thereof, it will be understood that many changes and modifications may be made without departing from the spirit of the invention.

I claim.

1. A variable transmission mechanism for automobiles and the like comprising a casing, a sun gear mounted in said casing, a driving shaft mounted in said casing and secured to said sun gear, planet gears meshing with said sun gear, shafts for said planet gears revolvably mounted in said casing, a second set of planet gears respectively secured to said planet gear shafts, a second sun gear meshing respectively with said second set of planet gears, a driven shaft secured to said second sun gear and rotatably mounted in said casing, said planet gear shafts including crank shaft portions, a set of centrifugal devices corresponding to said planet gear shafts, a link for each centrifugal device pivotally connecting its centrifugal device with one of said crank shaft portions and a link for each centrifugal device connecting its centrifugal device with an associated planet gear shaft.

2. A variable transmission mechanism for automobiles and the like comprising a casing, a sun gear mounted in said casing, a driving shaft mounted in said casing and secured to said sun gear, planet gears meshing with said sun gear, shafts for said planet gears revolvably mounted in said casing, a second set of planet gears respectively secured to said planet gear shafts, a second sun gear meshing respectively with said second set of planet gears, a driven shaft secured to said second sun gear and rotatably mounted in said casing, said planet gear shafts including crank shaft portions, said planet gear shafts being two in number, a pair of centrifugal devices, links connecting said centrifugal devices respectively with said pair of crank shaft portions and a link connecting each centrifugal device with the associated planet gear shaft.

In testimony whereof I have signed this specification this 18th day of June, 1928.

WILLIAM PITT.